(12) United States Patent
Johal et al.

(10) Patent No.: US 9,808,030 B2
(45) Date of Patent: Nov. 7, 2017

(54) SALT COMPOSITION

(75) Inventors: Sarjit Johal, Iowa City, IA (US); Albert J. Pollmeier, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 895 days.

(21) Appl. No.: 13/370,802

(22) Filed: Feb. 10, 2012

(65) Prior Publication Data

US 2012/0207890 A1    Aug. 16, 2012

Related U.S. Application Data

(60) Provisional application No. 61/441,750, filed on Feb. 11, 2011.

(51) Int. Cl.
*A23L 27/40* (2016.01)

(52) U.S. Cl.
CPC .................................. *A23L 27/40* (2016.08)

(58) Field of Classification Search
None
See application file for complete search history.

(56) References Cited

U.S. PATENT DOCUMENTS

| | | | |
|---|---|---|---|
| 462,730 A | 11/1891 | Ougley | |
| 2,539,012 A | 1/1951 | Diamond et al. | |
| 2,868,655 A | 1/1959 | Ladenburg | |
| 2,922,697 A | 1/1960 | Bell | |
| 3,039,880 A | 6/1962 | Kawamura et al. | |
| 3,082,154 A | 3/1963 | Allan | |
| 3,085,944 A | 4/1963 | Valentine | |
| 3,112,175 A | 11/1963 | Schultz | |
| 3,240,558 A | 3/1966 | Heiss | |
| 3,290,158 A | 12/1966 | Treat | |
| 3,556,718 A | 1/1971 | Bachmann et al. | |
| 3,760,941 A | 9/1973 | Singewald et al. | |
| 3,821,436 A | 6/1974 | Fry | |
| 3,855,397 A | 12/1974 | Hoffman et al. | |
| 4,127,235 A | 11/1978 | Klaile et al. | |
| 4,261,793 A | 4/1981 | Nakamura et al. | |
| 4,294,829 A | 10/1981 | Suzuki et al. | |
| 4,341,759 A | 7/1982 | Bogentoft et al. | |
| 4,397,907 A | 8/1983 | Rosser et al. | |

(Continued)

FOREIGN PATENT DOCUMENTS

| | | |
|---|---|---|
| CA | 1147653 | 12/1979 |
| DE | 4041563 | 6/1992 |

(Continued)

OTHER PUBLICATIONS

Kidshealth.org. "Dehydration", 2002, source http://replay.waybackmachine.org/20021117135207/http://endoflifecare.tripod.com/juvenilehuntingtonsdisease/id51.html, pp. 1-5.

(Continued)

*Primary Examiner* — Tamra L Dicus
(74) *Attorney, Agent, or Firm* — Fitch, Even, Tabin & Flannery LLP

(57) ABSTRACT

A low sodium salt composition and method for manufacture are provided. The composition generally includes salt, such as sodium chloride, and one or more crystallization interrupters. The composition is in the form of amorphous particles, optionally in combination with other ingredients.

34 Claims, 10 Drawing Sheets

(56) References Cited

U.S. PATENT DOCUMENTS

| | | |
|---|---|---|
| 4,423,099 A | 12/1983 | Mueller et al. |
| 4,460,563 A | 7/1984 | Calanchi |
| 4,476,804 A | 10/1984 | Glatt et al. |
| 4,486,435 A | 12/1984 | Schmidt et al. |
| 4,514,574 A | 4/1985 | Inoue et al. |
| 4,540,602 A | 9/1985 | Motoyama et al. |
| 4,556,566 A | 12/1985 | Bell |
| 4,556,577 A | 12/1985 | Meyer |
| 4,560,574 A | 12/1985 | Meyer |
| 4,568,559 A | 2/1986 | Nuwayser et al. |
| 4,582,731 A | 4/1986 | Smith |
| 4,590,206 A | 5/1986 | Forrester et al. |
| 4,624,848 A | 11/1986 | Lee |
| 4,749,576 A | 6/1988 | Lee |
| 4,760,093 A | 7/1988 | Blank et al. |
| 4,784,878 A | 11/1988 | Haak |
| 4,835,187 A | 5/1989 | Reuter et al. |
| 4,898,781 A | 2/1990 | Onouchi et al. |
| 4,919,853 A | 4/1990 | Alvarez et al. |
| 4,923,720 A | 5/1990 | Lee et al. |
| 4,952,402 A | 8/1990 | Sparks et al. |
| 4,999,189 A | 3/1991 | Kogan et al. |
| 5,000,888 A | 3/1991 | Kilbride, Jr. et al. |
| 5,009,367 A | 4/1991 | Nielsen |
| 5,066,522 A | 11/1991 | Cole et al. |
| 5,094,862 A | 3/1992 | Bunick et al. |
| 5,098,723 A | 3/1992 | Dubois |
| 5,098,724 A | 3/1992 | DuBois |
| 5,173,323 A | 12/1992 | Omari |
| 5,178,878 A | 1/1993 | Wehling et al. |
| 5,219,575 A | 6/1993 | Van Bommel et al. |
| 5,221,731 A | 6/1993 | Weymans et al. |
| 5,229,486 A | 7/1993 | Paul et al. |
| 5,232,707 A | 8/1993 | Lokensgard |
| 5,254,330 A | 10/1993 | Gardenton et al. |
| 5,260,306 A | 11/1993 | Boardman et al. |
| 5,269,980 A | 12/1993 | Levendis et al. |
| 5,279,708 A | 1/1994 | Wood et al. |
| 5,302,581 A | 4/1994 | Sarin et al. |
| 5,354,562 A | 10/1994 | Platz et al. |
| 5,354,934 A | 10/1994 | Pitt et al. |
| 5,376,386 A | 12/1994 | Gardenton et al. |
| 5,384,133 A | 1/1995 | Boyes et al. |
| 5,424,076 A | 6/1995 | Gorissen et al. |
| 5,482,720 A | 1/1996 | Murphy et al. |
| 5,494,681 A | 2/1996 | Cucu et al. |
| 5,510,116 A | 4/1996 | Bosch et al. |
| 5,518,187 A | 5/1996 | Bruno et al. |
| 5,518,709 A | 5/1996 | Sutton et al. |
| 5,548,004 A | 8/1996 | Mandel et al. |
| 5,554,382 A | 9/1996 | Castor |
| 5,607,697 A | 3/1997 | Alkire et al. |
| 5,622,657 A | 4/1997 | Takada et al. |
| 5,639,475 A | 6/1997 | Bettman et al. |
| 5,651,990 A | 7/1997 | Takada et al. |
| 5,667,806 A | 9/1997 | Kantor |
| 5,705,174 A | 1/1998 | Benoff et al. |
| 5,708,039 A | 1/1998 | Daly et al. |
| 5,709,886 A | 1/1998 | Bettman et al. |
| 5,716,558 A | 2/1998 | Nielsen et al. |
| 5,723,269 A | 3/1998 | Akagi et al. |
| 5,725,836 A | 3/1998 | Rouanet et al. |
| 5,727,333 A | 3/1998 | Folan |
| 5,776,491 A | 7/1998 | Allen, Jr. et al. |
| 5,795,594 A | 8/1998 | York et al. |
| 5,807,576 A | 9/1998 | Allen, Jr. et al. |
| 5,807,578 A | 9/1998 | Acosta-Cuello et al. |
| 5,851,453 A | 12/1998 | Hanna et al. |
| 5,855,913 A | 1/1999 | Hanes et al. |
| 5,874,029 A | 2/1999 | Subramaniam et al. |
| 5,916,596 A | 6/1999 | Desai et al. |
| 5,952,008 A | 9/1999 | Backstrom et al. |
| 5,976,574 A | 11/1999 | Gordon |
| 5,985,248 A | 11/1999 | Gordon et al. |
| 5,985,309 A | 11/1999 | Edwards et al. |
| 5,993,805 A | 11/1999 | Sutton et al. |
| 6,001,336 A | 12/1999 | Gordon |
| 6,017,310 A | 1/2000 | Johnson et al. |
| 6,051,257 A | 4/2000 | Kodas et al. |
| 6,057,476 A | 5/2000 | Furukawa et al. |
| 6,063,138 A | 5/2000 | Hanna et al. |
| 6,090,419 A * | 7/2000 | Popplewell et al. ............ 426/96 |
| 6,116,516 A | 9/2000 | Ganan-Calvo |
| 6,117,455 A | 9/2000 | Takada et al. |
| 6,123,936 A * | 9/2000 | Platz et al. .................. 424/85.6 |
| 6,140,598 A | 10/2000 | Schoenert et al. |
| 6,143,211 A | 11/2000 | Mathiowitz et al. |
| 6,149,941 A | 11/2000 | Schwarz et al. |
| 6,156,247 A | 12/2000 | Moschini et al. |
| 6,174,469 B1 | 1/2001 | Ganan-Calvo |
| 6,197,835 B1 | 3/2001 | Ganan-Calvo |
| 6,235,224 B1 | 5/2001 | Mathiowitz et al. |
| 6,242,040 B1 * | 6/2001 | Kakiuchi et al. .............. 426/649 |
| 6,258,341 B1 | 7/2001 | Foster et al. |
| 6,290,991 B1 | 9/2001 | Roser et al. |
| 6,316,029 B1 | 11/2001 | Jain et al. |
| 6,322,897 B1 | 11/2001 | Borchert et al. |
| 6,331,290 B1 | 12/2001 | Morgan |
| 6,331,310 B1 | 12/2001 | Roser et al. |
| 6,387,410 B1 | 5/2002 | Woolfe et al. |
| 6,414,050 B1 | 7/2002 | Howdle et al. |
| 6,551,617 B1 | 4/2003 | Corbo et al. |
| 6,565,885 B1 | 5/2003 | Tarara et al. |
| 6,572,893 B2 | 6/2003 | Gordon et al. |
| 6,613,898 B1 | 9/2003 | Barresi et al. |
| 6,656,492 B2 | 12/2003 | Kajiyama et al. |
| 6,660,382 B2 | 12/2003 | Nouri et al. |
| 6,860,907 B1 | 3/2005 | Hanna et al. |
| 6,919,446 B1 | 7/2005 | Antrim et al. |
| 7,115,280 B2 | 10/2006 | Hanna et al. |
| 7,405,293 B1 | 7/2008 | Barresi et al. |
| 7,595,393 B2 | 9/2009 | Barresi et al. |
| 7,728,125 B2 | 6/2010 | Barresi et al. |
| 7,816,105 B2 | 10/2010 | Bazin et al. |
| 7,923,047 B2 * | 4/2011 | Jensen et al. .................... 426/97 |
| 7,989,016 B2 | 8/2011 | Chigurupati |
| 8,197,878 B2 * | 6/2012 | Chigurupati .................. 426/649 |
| 8,329,236 B2 * | 12/2012 | Chigurupati .................... 426/74 |
| 2002/0000681 A1 | 1/2002 | Gupta et al. |
| 2002/0071871 A1 | 6/2002 | Snyder et al. |
| 2002/0081266 A1 | 6/2002 | Woolf et al. |
| 2002/0114844 A1 | 8/2002 | Hanna et al. |
| 2003/0124193 A1 | 7/2003 | Snyder et al. |
| 2003/0047824 A1 | 9/2003 | Hanna et al. |
| 2003/0109421 A1 | 9/2003 | Palakodaty et al. |
| 2003/0170310 A1 | 9/2003 | Wadhwa |
| 2003/0175214 A1 | 9/2003 | Staniforth et al. |
| 2003/0203036 A1 | 10/2003 | Gordon et al. |
| 2003/0215514 A1 | 11/2003 | Piatz et al. |
| 2004/0071783 A1 | 4/2004 | Hanna et al. |
| 2004/0119179 A1 | 6/2004 | Perrut et al. |
| 2004/0213798 A1 | 10/2004 | Maa et al. |
| 2005/0031769 A1 | 2/2005 | Wantanabe et al. |
| 2005/0170000 A1 | 8/2005 | Walker et al. |
| 2005/0191396 A1 | 9/2005 | Seltzer et al. |
| 2005/0206023 A1 | 9/2005 | Hanna et al. |
| 2006/0286275 A1 | 12/2006 | Salemme et al. |
| 2007/0059428 A1* | 3/2007 | Chigurupati .................. 426/648 |
| 2008/0003339 A1 | 1/2008 | Johnson et al. |
| 2008/0003344 A1 | 1/2008 | Jensen et al. |
| 2008/0008790 A1 | 1/2008 | Jensen et al. |
| 2008/0085360 A1* | 4/2008 | Chigurupati .................. 426/649 |
| 2009/0117254 A1* | 5/2009 | Chigurupati .................. 426/622 |
| 2009/0297631 A1 | 12/2009 | Adkins |
| 2010/0062140 A1 | 3/2010 | Kiyokawa |
| 2010/0222220 A1 | 9/2010 | Hanna |
| 2011/0098365 A1 | 4/2011 | Minter et al. |
| 2011/0229607 A1 | 9/2011 | Wang et al. |

(56) References Cited

U.S. PATENT DOCUMENTS

| | | | |
|---|---|---|---|
| 2012/0207890 A1 | 8/2012 | Johal | |
| 2013/0295180 A1* | 11/2013 | Minter et al. | 424/489 |

FOREIGN PATENT DOCUMENTS

| | | |
|---|---|---|
| DE | 19653011 | 6/1998 |
| EP | 0072046 | 2/1983 |
| EP | 0122036 | 10/1984 |
| EP | 0322687 | 7/1989 |
| EP | 0344375 | 12/1989 |
| EP | 0360340 | 3/1990 |
| EP | 0383569 | 8/1990 |
| EP | 0461930 | 12/1991 |
| EP | 0464171 | 1/1992 |
| EP | 469725 | 2/1992 |
| EP | 512693 | 11/1992 |
| EP | 0542314 | 5/1993 |
| EP | 0611567 | 8/1994 |
| EP | 628331 | 12/1994 |
| EP | 0661091 | 7/1995 |
| EP | 674541 | 10/1995 |
| EP | 0677332 | 10/1995 |
| EP | 681843 | 11/1995 |
| EP | 709085 | 5/1996 |
| EP | 899017 | 3/1999 |
| EP | 972526 | 1/2000 |
| EP | 1004349 | 5/2000 |
| EP | 1022020 | 7/2000 |
| EP | 2 018 860 A1 | 1/2009 |
| EP | 2018860 | 1/2009 |
| GB | 13803 | 8/1954 |
| GB | 1122284 | 8/1968 |
| GB | 1361510 | 6/1972 |
| GB | 2105189 | 3/1983 |
| GB | 2322326 | 8/1998 |
| GB | 2371501 | 7/2002 |
| GB | 0300338.1 | 2/2003 |
| GB | 0300339.9 | 2/2003 |
| GB | 2440138 | 1/2008 |
| JP | 57141274 A | 9/1982 |
| JP | 60232074 A | 11/1985 |
| JP | 1176437 | 7/1989 |
| JP | 04008275 A | 1/1992 |
| JP | 4036233 | 2/1992 |
| JP | 4187739 | 7/1992 |
| JP | 5057166 | 3/1993 |
| JP | 06070711 A | 3/1994 |
| JP | 7101882 | 4/1994 |
| JP | 101884 | 4/1995 |
| JP | 7101881 | 4/1995 |
| JP | 7101883 | 4/1995 |
| JP | 07213249 A | 8/1995 |
| JP | 242568 | 9/1995 |
| JP | 408015955 | 1/1996 |
| JP | 8067666 | 3/1996 |
| JP | 9082319 | 3/1997 |
| JP | 2000041613 A | 2/2000 |
| JP | 2001078729 A | 3/2001 |
| JP | 2002330722 A | 11/2002 |
| JP | 2004105066 A | 4/2004 |
| JP | 2006124234 | 5/2006 |
| JP | 2006256985 A | 9/2006 |
| KR | 9611238 | 8/1996 |
| KR | 20020068706 | 8/2002 |
| KR | 2001000706 | 11/2002 |
| WO | WO8102975 | 10/1981 |
| WO | WO8804556 | 6/1988 |
| WO | WO8807870 | 10/1988 |
| WO | WO88/09163 | 12/1988 |
| WO | WO9003782 | 4/1990 |
| WO | WO9011139 | 10/1990 |
| WO | 9115430 | 10/1991 |
| WO | WO9218164 | 10/1992 |
| WO | WO9302712 | 2/1993 |
| WO | WO9501221 | 1/1995 |
| WO | WO9501324 | 1/1995 |
| WO | WO9521688 | 8/1995 |
| WO | WO9600610 | 1/1996 |
| WO | WO96/22676 | 8/1996 |
| WO | WO9714407 | 4/1997 |
| WO | WO9731691 | 9/1997 |
| WO | WO97/40704 | 11/1997 |
| WO | WO98/07324 | 2/1998 |
| WO | WO9813136 | 4/1998 |
| WO | WO9817676 | 4/1998 |
| WO | WO9829096 | 7/1998 |
| WO | WO9836825 | 8/1998 |
| WO | WO9846215 | 10/1998 |
| WO | WO9917742 | 4/1999 |
| WO | WO9917748 | 4/1999 |
| WO | WO9930834 | 6/1999 |
| WO | WO9944733 | 9/1999 |
| WO | WO9952550 | 10/1999 |
| WO | WO9959710 | 11/1999 |
| WO | WO0030612 | 6/2000 |
| WO | WO0030613 | 6/2000 |
| WO | WO0030617 | 6/2000 |
| WO | WO0067892 | 11/2000 |
| WO | WO0103821 | 1/2001 |
| WO | WO0115664 | 3/2001 |
| WO | WO0145731 | 6/2001 |
| WO | WO0232462 | 4/2002 |
| WO | WO0238127 | 5/2002 |
| WO | WO02058674 | 8/2002 |
| WO | WO03008082 | 1/2003 |
| WO | WO04098561 | 11/2004 |
| WO | 2008024820 | 2/2008 |
| WO | WO2008/039533 | 4/2008 |
| WO | WO/2009/133409 | 5/2009 |
| WO | 2009/133409 | 11/2009 |

OTHER PUBLICATIONS

Scott, D.C., et al., "Design and Manufacture of Zero-Order . . .", 1991 Pharmaceutical Research, 8, pp. 156-161.

Tanya, M., et al., "Analysis of Drug Distribution in Hydrogels . . .", 1995, Pharmaceutical Research, 12, pp. 2030-2035.

European Patent Office's Notice of Opposition to a European patent dated Oct. 8, 2008. (NEKT0003.C1).

Proprietor's letter dated Feb. 9, 2005. (NEKT0003.C1).

Proprietor's letter dated Jun. 15, 2006. (NEKT0003.C1).

Raouf Gharderi: A Supercritical Fluids Extraction Process for the Production of Drug Loaded Biodegradable Microparticles (Upsala 2000). (NEKT0003.C1).

Ghaderi et al.: Preparation of Biodegradable Microparticles Using Solution-Enhanced Dispersion by Supercritical Fluids (SEDS) (Pharmaceutical Research vol. 16, No. 5, 1999). (NEKT0003.C1).

International Search Report for PCT/GB2009/050458, dated Sep. 4, 2009.

International Preliminary Report on Patentability for PCT/GB2009/050458, dated Nov. 2, 2010.

Document filed in EPO on Nov. 30, 2011 in response to Examination Report dated May 20, 2011 in PCT International Application No. PCT/GB2009/050458 (EP Appln. No. 2009738439.0).

Al-Orman et al., "Formulation and Physicochemical Evaluations of Diclofenac Sodium Chewable Tablets," Saudi Pharmaceutical J., 10(40:177-183, (2002).

Bodmeier et al., "Polymeric Microspheres Prepared by Spraying into Compressed Carbon Dioxide." Pharmaceutical Research. vol. 12. No. 8, 0.1211-1217 (1995).

Chang et al., "Precipitation of Microsize Organic Particles from Supercritical Fluids," AIChE Journal. vol. 35, No. 11. 0.1876-1882 (Nov. 1989).

Dixon et al., "Polymeric Materials formed by Precipitation with a Compressed Fluid Antisolvent." AIChe J .. vol. 39 (No. O. p. 127-139 (1993).

(56) References Cited

OTHER PUBLICATIONS

Ghaderi et al., "A New Method for Preparing Biodegradable Microparticles and Entrapment of Hydrocortisone in DL-PLG Microparticles Using Supercritical Fluids." European J. of Pharm. Sci. vol. 10. No. 1, Mar. 2000. D. 1-9.

He et al., "Chitosan Microshperes Prepared by Spray Drying," International J. Pharm. (Amsterdam), vol. 187, No. 1, o. 53-65.

J.D. Meyer et al., "Preparation and in vitro characterization of gentamycin-impregnated biodegradable beads suitable for treatment of osteomyelitis." J. of Pharm. Sci. vol. 87. No. 9, Sep. 1, 1998. p. 1149-1154.

J. Stafford, "Hydroxypropyl Methyphthalate as Enteric Coating for Tables/Granuales," Drug Dev. Ind. Pharm .. 1982, 8. 0.513-530.

Jung et al. "Particle Design Using Supercritical Fluids: Literature and Patent Survev." J. of Supercritical Fluids vol. 20. n. 179-219 (2001).

K. Lehman, "Coating of Tables and Small Particles with Acrylic Resins by Fluid Bed Technology." Int. J. Pharm. Tech. Prod. Mfr. 1981. 2(4). p. 3143.

Kovacs et al., "Hydroxyethylcellulose for Tablet Coating," Drug Dev. Ind. Pharm., 1990, 16, '0.2302-2323.

Moneghini M. et al., "Processing of Carbamazepine-PEG 4000 Solid Dispersions with Supercritical Carbon Dioxide:," International J. of Pharm. Netherlands Jul. 3, 2001, vol. 222. No. 1. p. 129-138.

Phillips et al., "Rapid Expansion from Supercritical Solutions: Application to Pharmaceutical Processes," International J. of Pharmaceutics, vol. 94. p. 1-10 (1993).

Sajeev et al., "Oral controlled release formulation of diclofenac sodium by microencapsulation with ethyl cellulose", J. Microencapsulation, 19(6):753-760, (2002).

Sanchez et al., "Development of Biodegradable Microspheres and Nanospheres for the Controlled Release of Cyclosporin A." International J. of Pharmaceutics. vol. 99, p. 263-273(1993).

Toni Debenedtti, "Particle Formation with Supercritical Fluids—A Review", J. Aerosol. Sci. 22(5):555-584, (1991).

Tom et al., "Formulating of Bioerodible Polymeric Microspheres and Microparticles by Rapid Expansion of Supercritical Solutions," Biotechnol. Prog., vol. 7, p. 403-411 (1991).

Vudathala et al., "Microencapsulation of Solid Dispersions: Release of Griseofulvin from Griseofulvin: Phospholipid Correcipitates in Microspheres," Pharm. Research. vol. 9, No. 6. Jun. 1, 1992. p. 759-763.

International Search Report of PCT/JP2006/324022, dated Jan. 30, 2007.

Notification of Transmittal of Transmittal of the International Preliminary Report on Patentability (Form PCT/IB/338) of International Application No. PCT/JP2006/324022 dated Jun. 11, 2009 with Forms PCT/IB373 and PCT/ISA/237.

\* cited by examiner

SALT COMPOSITION

CROSS-REFERENCE TO RELATED APPLICATION

This application claims benefit of U.S. Provisional Application No. 61/441,750, filed Feb. 11, 2011, which is hereby incorporated herein by reference in its entirety.

FIELD

This application relates in various aspects to salt compositions, to methods for preparing same, and to related compositions and methods.

BACKGROUND

Recently, there has been an increasing interest in reducing dietary sodium consumption. Many health organizations and professionals suggest that excessive sodium use may lead to or aggravate detrimental health conditions such as hypertension and arterial disease.

Some prior attempts to lower dietary sodium can be broadly grouped into three general categories, which include multi component ingredient blends that include varying amounts of sodium chloride; physiochemical modifications to evaporated salts; and salt substitutes such as non sodium and botanical flavorants. These approaches may also be used in combination. However, except in medical and niche applications, the complete elimination or substitution of dietary sodium chloride is difficult and generally elusive.

Salt blends and substitutes employing some of these concepts have been commercialized to varying degrees of success. For example, a number of low- or no-sodium products use potassium chloride in conjunction with other materials, sometimes referred to as masking agents, which are used to modify the bitterness or other off flavors generally associated with potassium salt. Other attempts have employed mixtures of ingredients to modify taste as well as the overall perception so they more closely resemble the physical characteristics of salt, such as particle size, bulk density and the general feel and appearance of salt. Most models based on this practice employ flavor neutral or inert fillers and carriers in conjunction with sodium chloride and other salt. Examples of such fillers and carriers include carbohydrates such as starches, maltodextrins, fibers, waxes and other materials both soluble and insoluble. However, the use of fillers fails to overcome the highly crystallized nature of sodium chloride which hinders solubility of the salt, such as in low water environments.

Further, the use of sodium salt alternatives has been studied. These alternatives include other salts such as potassium, magnesium, calcium and combinations thereof, and in other cases flavorings derived from plant, microbial, animal, mineral or synthetic sources that mimic, enhance or otherwise promote and deliver the taste and sense of table salt.

While useful in select applications, many of these replacement products impart off flavors or are simply too weak to provide the expected flavor. Dilution is a particular challenge in systems that attempt to lower sodium in the absence of mimetic agents.

Other teachings have focused on the size, structure or dissolution characteristics of the salt crystal. These teachings highlight the poor solvation and dissociation properties of salt crystals. Particle size, morphology, and associated physical characteristics all relate to dissolution which contributes to how sodium chloride is consumed and used in the diet. For instance, reducing the size or increasing the surface area of a salt particle will increase the rate of dissolution. Further, the natural crystal structure of salt inherently makes it a poor delivery system for sodium especially in an environment such as the mouth where free water is limited. This limitation of table salt (or salt used in dry applications) can be partially resolved using some of the modifications noted, but these approaches have other issues including flowability and dusting that arise out of trying to dispense flaked powders and the like.

There are other examples of physical modifications or chemical additions to alter the taste and perception of table salt in order to achieve low sodium compositions that offer the taste experience of common table salt. Many of these methodologies and practices, however, have not yielded the expected results.

SUMMARY

Salt perception can be attained at a lower overall sodium chloride concentration than realized in conventional table salt by providing a salt particle that is more soluble than crystalline salt. This is accomplished by providing a salt particle where at least some of the salt, and preferably a majority of the salt, is present in amorphous form. Such a salt particle may be prepared by interrupting the formation of salt crystals from an aqueous solution with a crystallization interrupter. The particles are suitable for consumption, particularly for those who wish to reduce sodium intake.

In some embodiments, the invention provides an amorphous particle that incorporates a salt, typically a sodium chloride salt, with a crystallization interrupter. In many embodiments, the particle contains about 15% to about 80% sodium chloride, and includes a crystallization interrupter selected from among biopolymers and biooligomers. The salt composition is in the form of the amorphous particles wherein some (and preferably a majority) of the sodium chloride in the particles is present in amorphous form. The particles may be agglomerated or may also be coated with crystalline salt in a two-phase mixture.

In other embodiments, the invention provides a method for preparing a salt composition. Generally, this method includes providing an aqueous solution that includes a salt, which again is typically sodium chloride, and a crystallization interrupter, and drying the aqueous solution to cause the crystallization interrupter and sodium chloride to form particles wherein some (and preferably a majority) of the sodium chloride in the particles is present in amorphous form. In many cases, the drying is accomplished by spray drying.

In other embodiments, the invention provides a seasoning composition, and in other embodiments, the invention provides a method for imparting a salty flavor to food. The seasoning composition generally includes a salt composition as described above in combination with another seasoning agent. The method for imparting salty flavor generally contemplates adding a salt composition as described above to food or during the manufacture of food These and other aspects may be understood more readily from the following description and the appended drawings.

DETAILED DESCRIPTION

Figure 1:
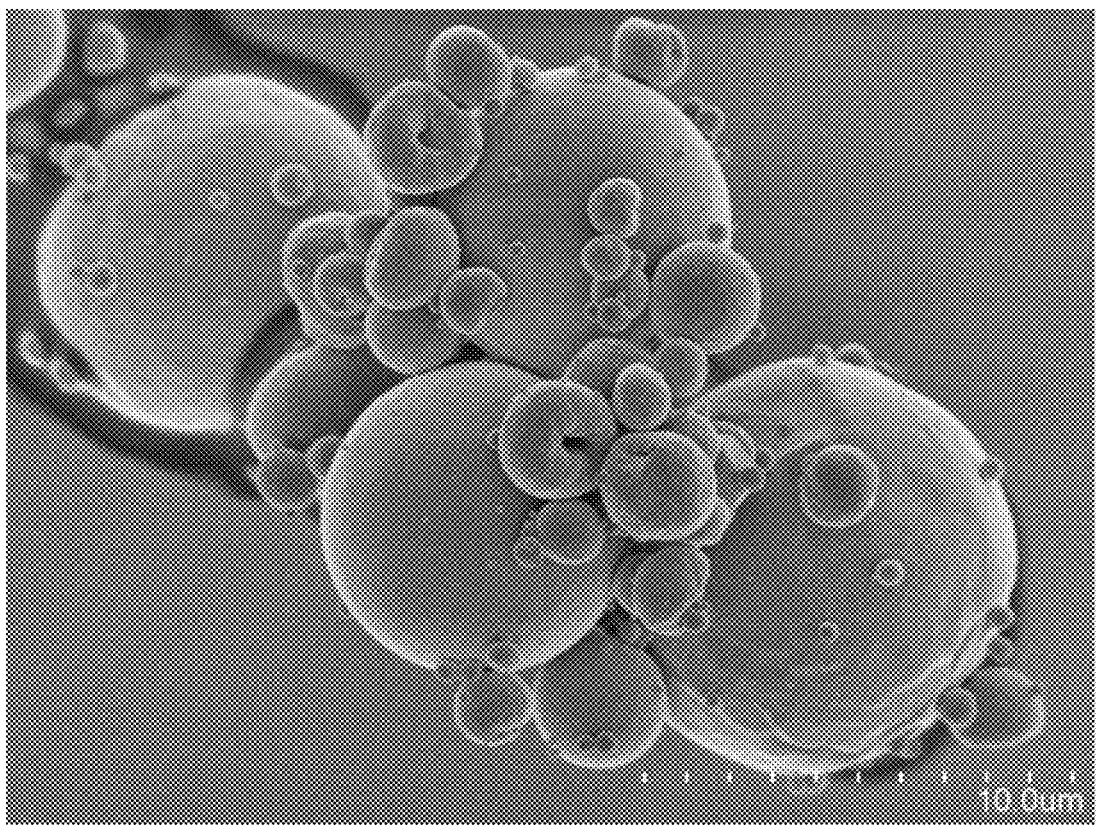
FIG. 1 is a 10 micron micrograph of a 50:50 sodium chloride and maltodextrin composition prepared in accordance with Example 1.

While it is not intended to limit the invention to a particular theory of operation, it is believed that a crystallization interrupter will interact with salt in solution to inhibit the formation of salt crystals upon drying. The crystallization interrupter is theorized to interact with one or more of the ions in solution and to thereby interrupt the recombination of the ions when the composition is dried. When dried, the particles in the composition are composed of an amorphous particle, where some (and preferably a majority) of the salt is present in noncrystalline form. These particles typically are not composed of discrete crystallized salt particles on the surface of a nonsalty carrier, as in some approaches. In some embodiments, substantially all of the salt is present in amorphous form. Amorphous form is contemplated to be as determined using electron microscopy at 5 micron resolution.

By this approach, in many cases the solubility of the salt relative to native salt crystals will increase. It is believed that this increase in solubility leads to an improved salt sensation. In dietary applications, by increasing the salt perception, the total amount of sodium chloride consumed may be reduced.

The salt particles exhibit favorable solvation characteristics upon wetting. In some forms, the material exhibits rapid dissolution and dispersion in low-moisture environments, and also exhibits adhesion to moistened food surfaces. Additionally, the salt composition can be further processed in various ways to produce different forms capable of delivering a broader array of sensory perceptions of salt.

Given the desire to decrease dietary sodium content, the invention in some forms contemplates particles of sodium chloride salt, or mixtures of sodium chloride and other salts such as magnesium chloride, potassium chloride, calcium chloride, and other edible salts. In some embodiments, the invention contemplates other salts that do not include sodium chloride. When sodium chloride is used, the salt may be any standard sodium chloride material. The material may take the form of a dry salt or a brine as supplied.

Many materials may be used as crystallization interrupters. These include biologic oligomers and biopolymers generally, such as proteins, protein derivatives and starches or starch derivatives. Hydrolyzed starches are deemed particularly suitable, these including syrup solids and malto-dextrins. Generally, the crystallization interrupter should be a nonionic and noncrystallizing (or low-crystallizing) materials that is suitable for consumption. In some embodiments it is contemplated that low molecular weight carbohydrates or carbohydrate derivatives may be employed, although in many cases these will be not suitable if the carbohydrate itself crystallizes.

The crystallization interrupter may be selected from any number of different biopolymer and biooligomer materials and combinations of multiple materials. The biopolymer may be a hydrocolloid or other similar material. The biopolymer may also be a polysaccharide or oligosaccharide. For example, the biopolymer may be a starch or hydrolyzed starch or the like. The crystallization interrupter may include any oligosaccharide species, such as a malto-oligosaccharide, or mixture of a plurality of oligosaccharide species, and more generally to polysaccharide species and mixtures thereof. By "polysaccharide" and "oligosaccharide" are contemplated any species comprised of plural saccharide-units, whether linked by 1-4 linkages, 1-6 linkages, or otherwise.

By "malto-oligosaccharides" is contemplated any species comprising two or more saccharide units linked predominately via 1-4 linkages, and including maltodextrins and syrup solids. In some forms, at least 50 percent of the saccharide units in the malto-oligosaccharide are linked via 1-4 linkages. More preferably, at least about 60 percent of the saccharide units are linked via 1-4 linkages; even more preferably, at least about 80 percent of the saccharide units are so linked. The malto-oligosaccharides may include saccharide species having an odd DP value, and the profile may be partially defined by a saccharide species having a DP value of 1, for example, dextrose or sorbitol. The mixture further may include other saccharide species or other components.

Further, in some embodiments, at least a portion of the malto-oligosaccharides in the mixture have a DP value greater than 5. In some cases, at least one of the malto-oligosaccharide species in the mixture has a DP value of 8 or more. In one form, at least one species has a DP value of at least 10. For example, in one form, at least 80 percent of the malto-oligosaccharide species in the mixture have a DP greater than 5, and at least 60 percent may have a DP greater than 8. In another form, at least 80 percent of the malto-oligosaccharides species have a DP greater than 10. In some forms, the DP profile of the crystallization interrupter is such that at least 75 percent of the malto-oligosaccharides species in the mixture have a DP greater than 5 and at least 40 percent of the species in the mixture have a DP greater than 10. Such materials may be obtained conventionally, for example, by the partial hydrolysis of starch.

It is also contemplated that reduced malto-oligosaccharides may be employed as crystallization interrupters. Further teachings concerning malto-oligosaccharides generally, and reduced malto-oligosaccharides, can be found in U.S. Pat. Nos. 7,816,105; 7,728,125; 7,595,393; 7,405,293; 6,919,446; and 6,613,898; each to Barresi et al. and each assigned to Grain Processing Corporation of Muscatine, Iowa. One suitable material is MALTRIN® M100, a maltodextrin sold by Grain Processing Corporation of Muscatine, Iowa. Other materials deemed to be suitable include other malto-oligosaccharides sold as maltodextrins under the trademark MALTRIN® by Grain Processing Corporation of Muscatine, Iowa. The MALTRIN® maltodextrins are malto-oligosaccharide products, each product having a known typical DP profile. Suitable MALTRIN® maltodextrins include, for example, MALTRIN® M040, MALTRIN® M050, MALTRIN® M100, MALTRIN® M150, and MAL- TRIN® M180. Typical approximate DP profiles of the subject MALTRIN® maltodextrins are set forth in one or more of the foregoing patents.

Maltodextrins are safe, widely used food grade ingredients, and are ideally suited for use in a dietary reduced sodium salt mixtures. Other favorable attributes include neutral taste and white coloration. Maltodextrins are manufactured from starches sourced from a number of starchy grains, including but not limited to corn, potato, wheat, tapioca and others.

The salt and crystallization interrupter may be present in any suitable amounts relative to one another. In some embodiments, the composition includes about 15% to about 80% sodium chloride. In others, the composition includes about 40% to about 70% sodium chloride. In yet other forms, the composition includes up to about 60% sodium chloride. Generally, in many cases sodium chloride is included in an amount of 15%, 20%, 25%, 30% 35%, 40%, 45%, 50%, 55%, 65%, 70%, 75%, or 80%. The composition may include from about 15% to about 85% crystallization interrupter, such as about 20% to about 50% crystallization interrupter. The crystallization interrupter may be included in amounts of as 20%, 25%, 30%, 35%, 40%, 45%, 50%, 55%, 60%, 65%, 70%, 75%, 80%, or 85%. These amounts refer to weight percentages relative to the total weight of salt and crystallization interrupter. When in aqueous solution, the solution may include any amount of water suitable to dissolve the salt and crystallization interrupter.

Figure 4:
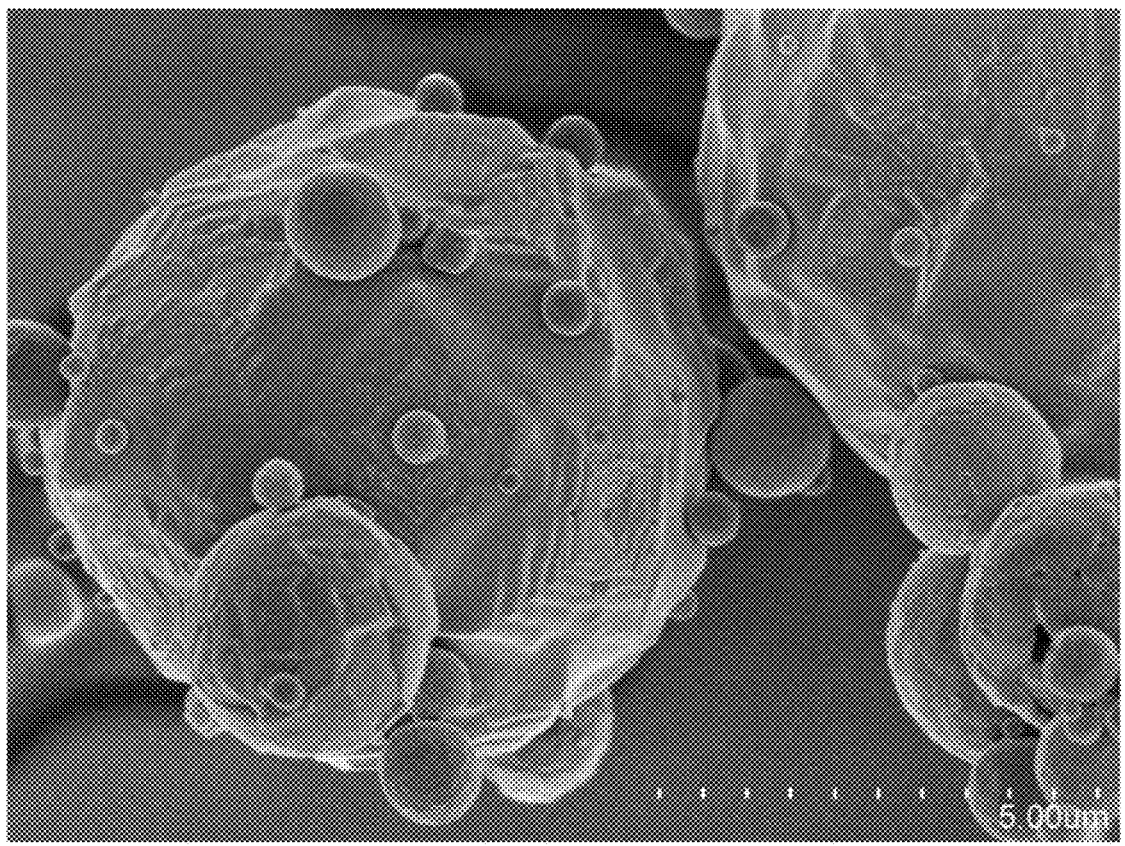
FIG. 4 is a 5 micron micrograph of an 80:20 sodium chloride and maltodextrin composition prepared in accordance with Example 2.
Figure 5:
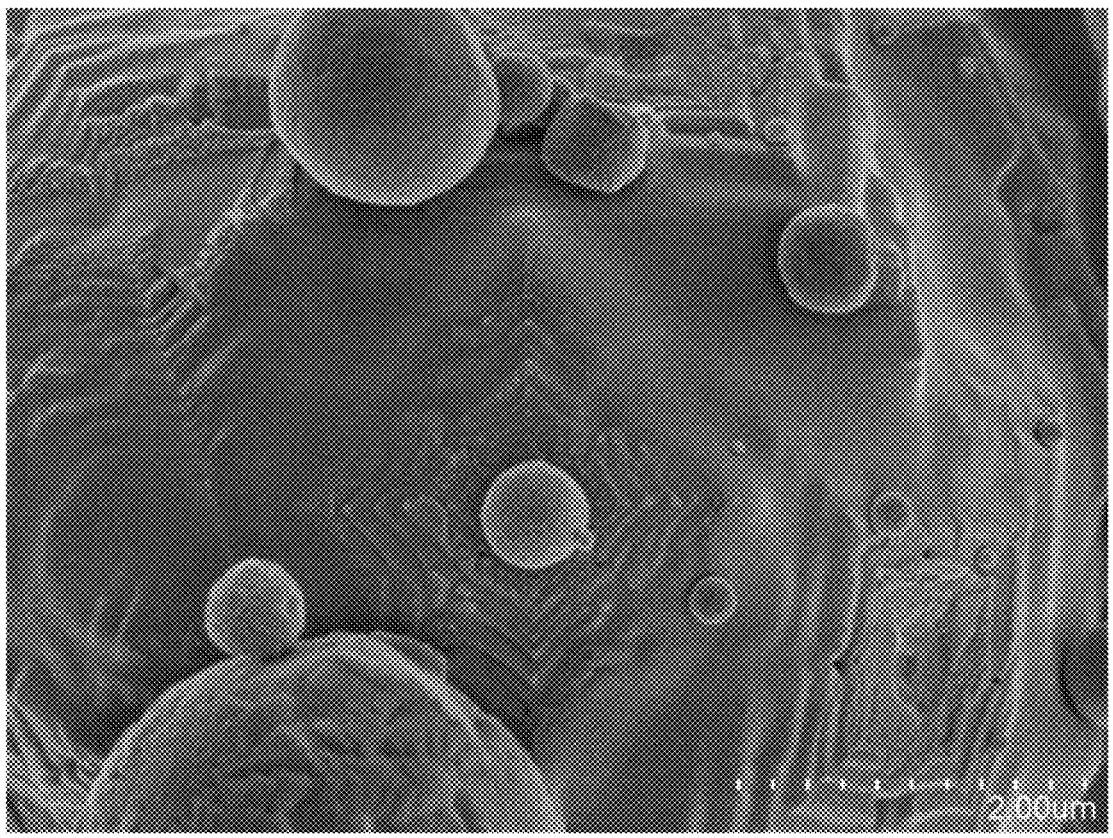
FIG. 5 is a 2 micron micrograph of the composition shown in FIG. 4.

It is believed that the effects of the crystallization interrupter is dependent on the relative concentration of salt and crystallization interrupter in the aqueous solution, and also possibly on the drying method and speed of drying. Where the salt present at a ratio of 80:20 salt:crystallization interrupter or greater, the sodium chloride appears to initiate nucleation with at least some crystal growth. At these high salt ratios, when the solution is dried, the particles are still generally amorphous, though they do include some features indicative of initial crystal formation, such as shown in FIGS. 4 and 5. Therefore, in this form, the structure appears to be a mosaic of different morphologies, including both amorphous features and initial crystal features. It is believed that by drying quickly, such as in a spray-drying system, the removal of water will quench the reaction between the crystallization interrupter and the salt, and will drive the formation of an amorphous particle.

Figure 9:
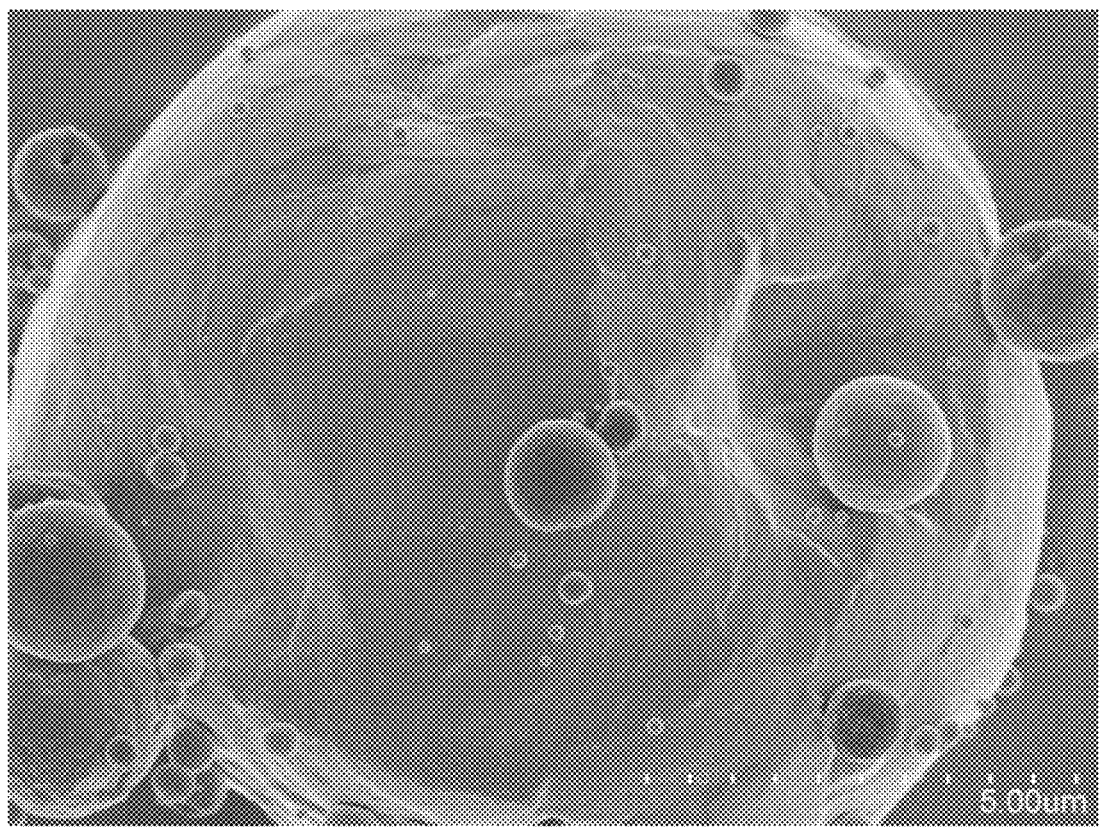
FIG. 9 is a 5 micron micrograph of a 60:40 sodium chloride and maltodextrin composition.
Figure 10:
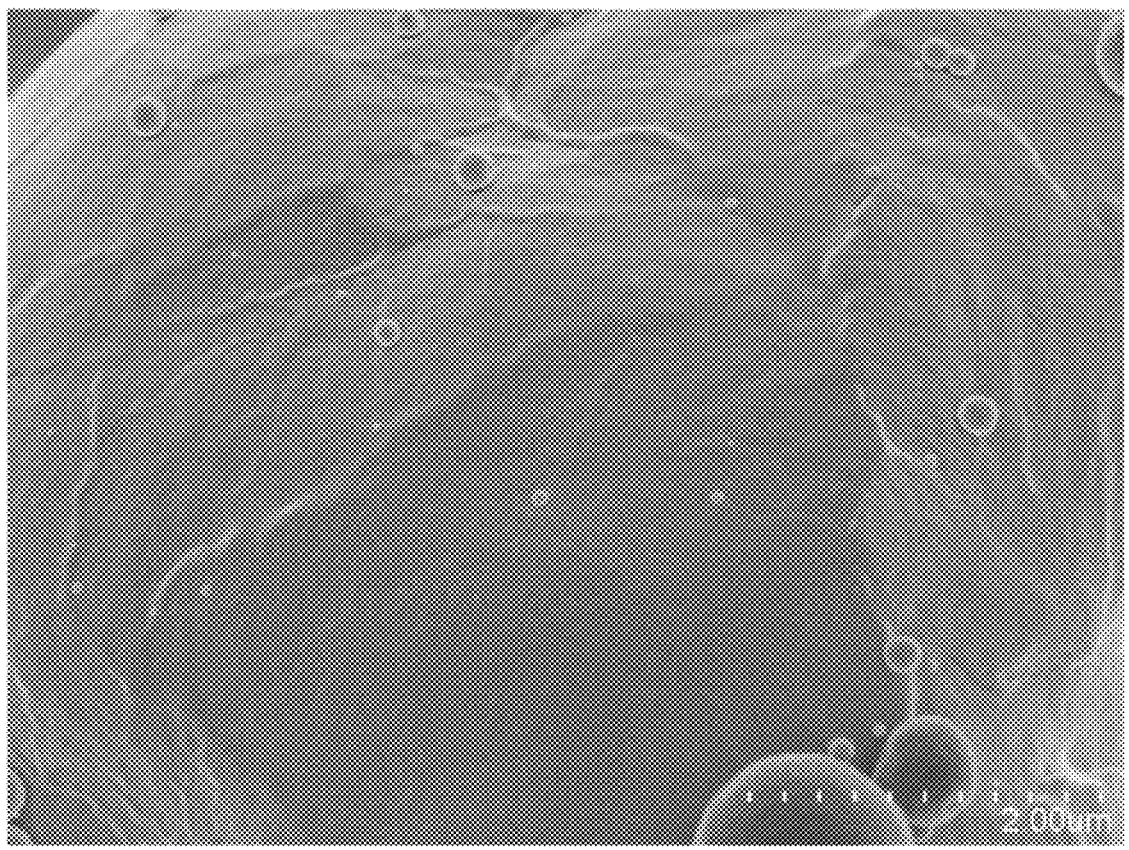
FIG. 10 is a 2 micron micrograph of the composition shown in FIG. 9.

As the ratio of salt to biopolymer decreases, crystallization is significantly retarded and may cease altogether. When salt is present at a ratio of 60:40 salt:crystallization interrupter or lower, there appears to be very little, if any, crystalline character to the dried particulate structures, particularly when dried quickly. This suggests that sodium chloride crystal nucleation may be inhibited or that the aqueous solution lacks sufficient free sodium chloride to allow crystals to grow. For example, as seen by comparing FIGS. 9 and 10 to FIGS. 4 and 5, the 60:40 composition depicted in FIGS. 9 and 10 shows essentially no crystal character in the particles. This finding is also consistent with the suggestion that the crystallization interrupter may be sequestering or otherwise making the sodium and chloride ions unavailable for bonding and subsequent crystal formation.

Regardless of the precise mechanism, it appears evident that the presence of crystallization interrupters, such as maltodextrin, in solution with salt strongly affects usual crystal formation and development. Consequently the structures (or interactions) formed in solution appear to suggest an association between the polysaccharide and ions. Subsequently, upon removal of water, the maltodextrin appears to be a nucleus for particle development with the sodium and chloride ion associated with the polymer while also interrupting crystal growth.

The interactions and paths to formation indicate the formation of mixed or hybrid structures when dried. In addition physicochemical characteristics, such as rapid dissociation when wetted, dispersal on the surface of semi moist foods, and low bulk density appear to distinguish the amorphous material from many known crystalline salt forms.

Generally, a majority of the salt in the particle is non-crystalline. In many cases, the amorphous composition is substantially non-crystalline, by which is contemplated 1% or less of observable salt crystalline structure. In another form, the composition has less than 5% crystallization. According to another form, the composition has less than 10% crystallization. In yet another form, the composition has less than 15% crystallization.

The sodium chloride and crystallization interrupter composition exhibits increased solubility when compared to sodium chloride in native form. For example, in one form, the sodium chloride and crystallization interrupter composition exhibits a solubility rate that is at least 1.5 times the solubility rate of similarly size sodium chloride particles. In another form, the sodium chloride and crystallization interrupter composition exhibits a solubility rate that is at least 2 times the solubility rate of similarly size sodium chloride particles. The increased solubilization and subsequent availability of sodium appears to diminish the need to substantially increase the total quantity consumed. In other words, this faster dissolution and dispersion in solution permits a more rapid salt perception and a decreased total intake of sodium chloride.

Generally, the method for preparing the amorphous salt particles includes providing an aqueous solution of salt and crystallization interrupter, along with any additional desired materials. The sodium chloride and crystallization interrupter may be combined with water, each individually, in combination or sequentially. If desired, the solution may be aggressively agitated until all of the solids have been completely dissolved. In one form, the solution is agitated for 30 to 60 minutes. The solution can also be heated to facilitate solubilization of the ingredients. The salt and maltodextrin ingredients can also be added individually to the liquid, that is, without prior dry blending. The dissolved solution is then dried to provide a dried material, which then be used as is, agglomerated and/or combined with further materials.

Once the solution is dissolved, the solution may be dried in any number of different manners or combinations of steps to produce dried particles, typically having a moisture content less than 2%, and preferably less than 1%. The drying process can include any suitable procedure such as spray-drying, evaporation, vacuum drying, or other drying techniques, or combinations of the above. It is generally preferred the drying technique remove water quickly. The physical attributes such as particle form, bulk density, solubility of the dried product may be influenced by the method of drying and the system or equipment employed. In addition, materials dried by different methods or under different conditions may exhibit different structures with altered degrees of crystalline character. Spray drying produces a fine, homogeneous powder which is usually less than 25 microns with a moisture content of 0.5 to 4% and preferably 1.5 to 3%.

In one form, the sodium chloride and crystallization interrupter composition is dried and forms a fine powder. In this regard, the particles have an average size of less than about 25 microns. These small particles may be agglomerated as desired, such as to provide the appearance of conventional table salt. In one form, the agglomerated particles may have an average size larger than about 100 microns. Binders, including but not limited to, polysaccharides, gums, and starches including modified starches, may be used for agglomeration. By this approach, salt particles may be produced having generally the same appearance, texture, flowability and other physical characteristics as conventional table salt.

Further, the reduced sodium salt mixture can be agglomerated alone or with a fine crystalline salt such as flour salt to further modify the flavor, physicochemical properties and final sodium content as needed. In this regard, the microcrystalline sodium chloride may be randomly dispersed throughout the particle and/or coated on the surface to provide an extended salt flavor profile as described above. For example, the coating may consist of microcrystalline salt dusted on the surface or sprayed on the surface with a binder. In some embodiments, crystallized sodium chloride may be coated onto the amorphous particle to provide a two-phase system. For example, it is believed that the composition may be created to provide a two phase delivery system, where there is an immediate release of sodium chloride from the non-crystalline combination with the biopolymer, followed by a delayed but extended salty flavor component from the added crystalline component.

The composition may also be treated and processed in a manner similar to standard table salt. For example, the composition could be iodized.

The amorphous composition may be used as a seasoning for food materials. In some embodiments, the salt composition is added as a seasoning in the preparation or manufacture of food products. For example, the salt composition may be included within the food material and/or sprinkled on the outer surfaces of the food material.

In other embodiments, the salt composition is provided in the form of a seasoning composition that includes the salt composition and one or more other seasonings. Exemplary seasonings include allspice, alum powder, chile pepper, anise, arrowroot, basil, bay leaves, bell pepper, black pepper, caraway seed, cardamom, red pepper celery, chervil, chives, cilantro, cinnamon, cloves, coriander, cream of tartar, Creole seasoning, cumin, curries, dill, fennel, garlic, ginger, horseradish, juniper, lemon, lime, mace, marjoram, mesquite, mustard, nutmeg, onion, oregano, paprika, parsley, peppercorn, poppy seed, rosemary, sage, savory, sesame tarragon, thyme, turmeric, and any other suitable seasoning. Further, the composition may include other materials such as vitamins, minerals, fibers, oils and combinations thereof. Soluble flavorings such as yeast extracts, plant extracts, fermented ingredients and can also be included. The additional materials may be included to provide a desired flavor profile, appearance, or other desired characteristic. Any suitable amounts of such materials may be used.

The following Examples are provided. These Examples are not intended to limit the invention in scope.

EXAMPLES

Example 1

A reduced sodium composition was prepared by combining sodium chloride with a maltodextrin. More specifically, 1000 g of MALTRIN® M100 maltodextrin was added to 4 liters of filtered tap water with agitation. The combination was agitated to allow the maltodextrin to completely dissolve. Next, 1 liter of filtered cold water was added with stirring. Then 1000 g of evaporated sodium chloride was added by sprinkling the salt into the M100 solution with mixing. After the salt was added, a further 1 liter of water was combined with the solution with stirring.

The final solution was clear and contained about 22% dry solids consisting of a 1:1 ratio of sodium chloride and maltodextrin. The solution was allowed to sit overnight at room temperature.

The sodium chloride and maltodextrin solution was spray dried using a modified Bowen Drier equipped with a 40/100 nozzle. The following drying conditions were used:

| | |
|---|---|
| air pressure to nozzle | 72-74 |
| fan setting | 74.0 |
| inlet temperature | 490-501 F. |
| outlet temperature | 222-238 F. |
| filter discharge temperature | 155-170 F. |
| filter inlet pressure | 1.2-1.9 |
| filter discharge pressure | 4.4-5.0 |
| fan discharge pressure | 2.8-3.4 |

During the process, no build-up was visually observed in the main chamber or in the baghouse. Approximately 1040 g of powder was recovered.

Analytical analysis of the sample revealed the following:

| | |
|---|---|
| Moisture | 2.7% |
| Ash (dry basis) | 49.81% |
| Particle Size Profile (% on SS Mesh) | |
| 325 mesh (45 micron) | 0.8% |
| 400 mesh (38 micron) | 1.7% |

The particles were ultimately determined to be about 25 microns.

Figure 2:
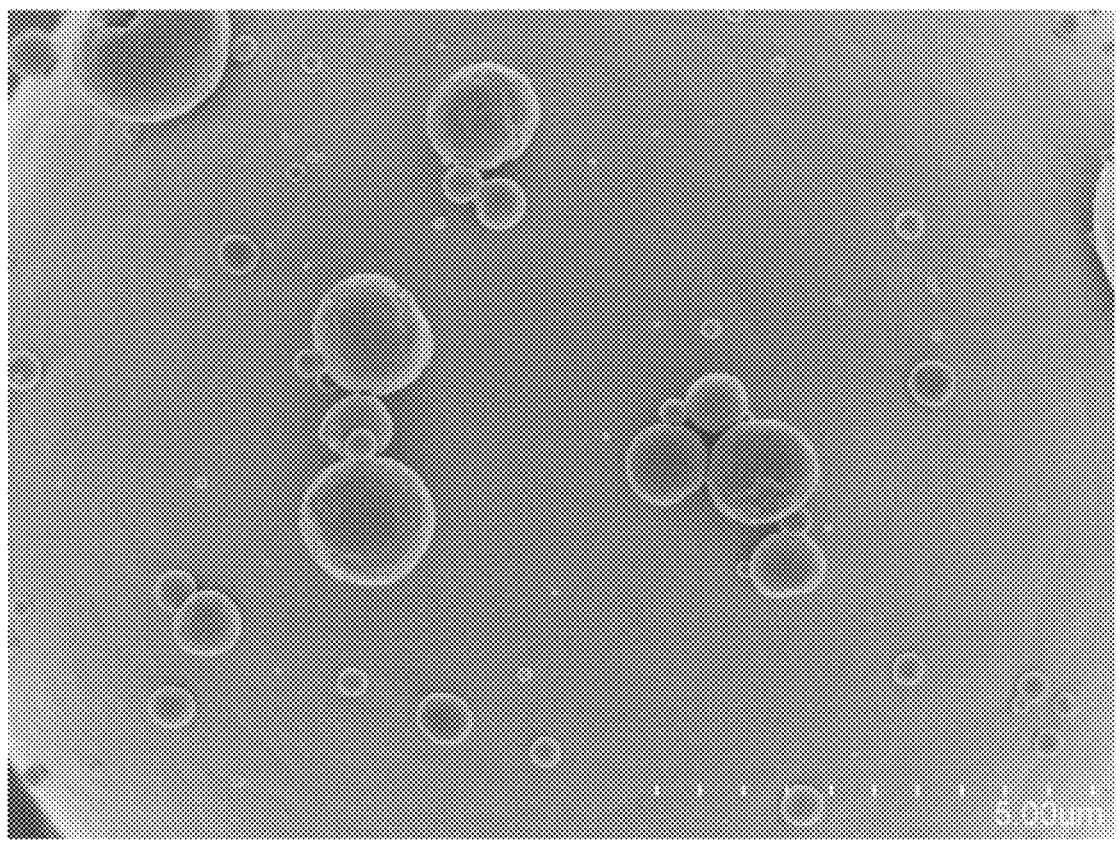
FIG. 2 is a 5 micron micrograph of the composition shown in FIG. 1.
Figure 3:
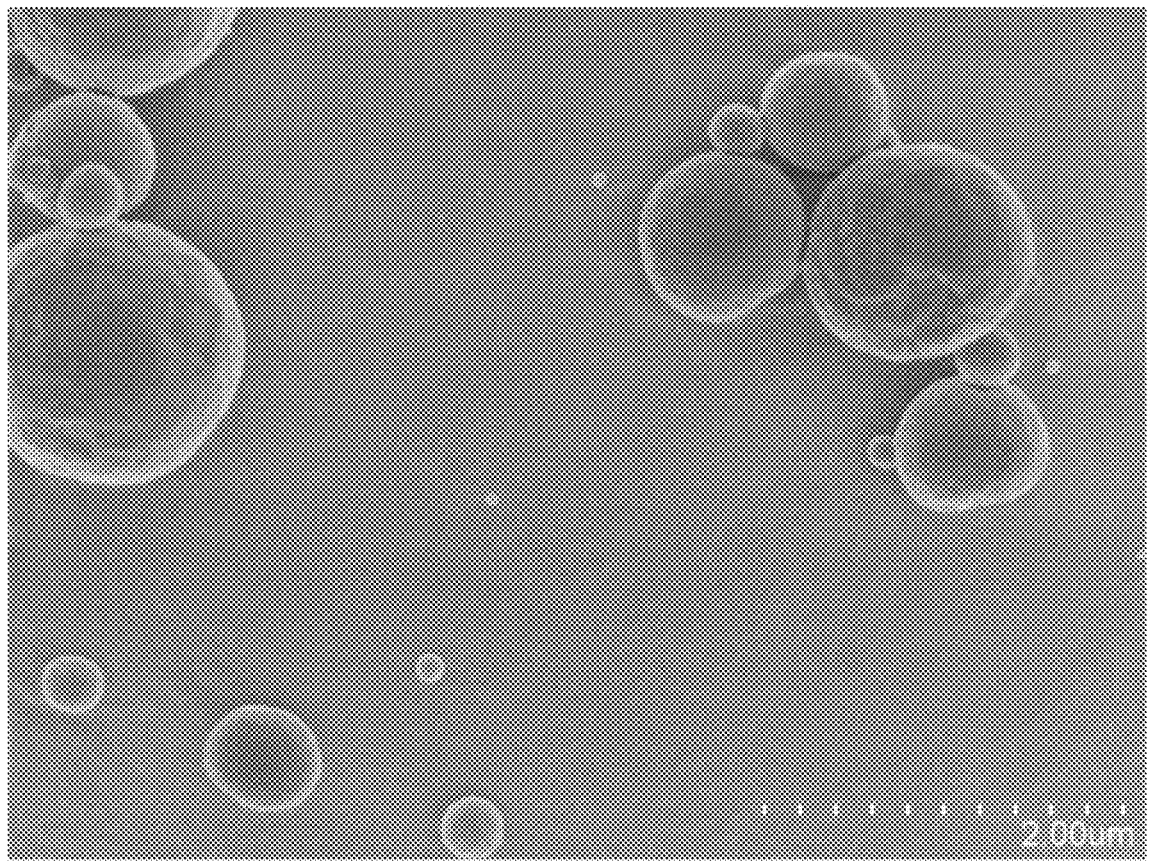
FIG. 3 is a 2 micron micrograph of the composition shown in FIG. 1.

An aliquot of the sample was stored in a plastic jar at room temperature and was later subjected to electron microscopy. The micrographs are shown in FIGS. 1-3. As seen, these particles show no salt crystal structure. These particles are believed to be hollow, generally uniform particles.

Example 2

Approximately 5 gallons of an 80:20 mixture of sodium chloride (Morton Refined Salt) and maltodextrin (MALTRIN® M100, Grain Processing Corporation) composition was prepared as generally outlined in Example 1. After complete dissolution of the ingredients, the clear solution was determined to contain about 27% dry solids.

The sodium chloride-maltodextrin blend was spray dried using the pilot scale Bowen Dryer described in Example 1. The dried white powder recovered had a moisture content of less than 3% (dry solid basis) and was free flowing.

The micrographs of the recovered 80:20 sodium chloride and maltodextrin particles (FIGS. 4 and 5) show the substantially non-crystalline character of the material. In FIG. 4 several small particles are visible on the surface of a larger particle that provides the background for the frame. FIG. 5 further illustrates this form. As seen in these figures, the particles are generally amorphous with very minor, initial crystal character appearing as part of the particles.

Example 3

Several different reduced sodium salt compositions were prepared using the procedures described in Example 1 to create reduced sodium salt mixtures (RSSM). Specific ingredients used in the composition include sea salt, potassium chloride, maltodextrin M100, salt enhancer (an 11% sodium fermented material sold by Natural Advantage of Oakdale, La.) and magnesium chloride. Sea salt was used instead of refined table salt because it is viewed as natural and preferred by many consumers over refined table salt.

|  | RSSM Sample I | RSSM Sample II | RSSM Sample III | RSSM Sample IV |
|---|---|---|---|---|
| Sea Salt | 70% | 60% | 60% | 60% |
| KCl |  | 10% | 10% | 14% |
| M100 | 30% | 30% | 26% | 20% |
| Salt Enhancer |  |  | 3% | 5% |
| MgCl |  |  | 2% | 1% |

The materials were added and mixed as described in Example 1. The order of addition did not appear to be important. The clear liquid compositions were adjusted to about 27% dry solids. The solutions were dried using the Bowen drier as described in Example 1.

Approximately 15 lbs of dry powder for each composition was recovered. The following attributes were observed:

Visually all four compositions were white and indistinguishable.

All four composition had bulk densities in the range of 0.32 to 0.34 gram\cc.

All composition had moistures ranging from about 2-3%.

All composition had particle sizes <25 microns.

Tasting (by untrained individuals) indicated that all compositions were salty and clear differences could be detected. Preferences varied amongst the group.

Example 4

Samples I, II, and III from Example 3 were agglomerated using a 5 kg Glatt Fluid Bed Batch Agglomerator. A 5% maltodextrin solution was used as a binder throughout the trial. Standardized generic operating conditions were developed and used for the three compositions. Approximately 100-120 minutes was required to agglomerate each composition.

Particle size analysis using screens showed that greater than 95% of the material recovered had a particle size greater than 150 microns and greater than about 85% of the material had a particle size greater than 250 microns.

The finished material was dry with a moisture content of less than 3% and was free flowing. Further the agglomerated composition exhibited comparable output when sprinkled from a salt shaker. Comparable output was estimated by visually comparing the amount of salt on a dark surface after a comparable number of shakes.

Example 5

While assessing the flowability of the agglomerated, screened compositions described in Example 3, it was observed that the RSSM particles appeared to adhere better to a surface than commercial table salt. This was observed on several different surfaces including paper and plastic.

Whether sprinkled from a shaker or manually using a spatula, it was observed that the approximately 300 micron commercial table salt particles consistently bounced off the surface. In contrast, the 250+ micron RSSM particles exhibited significantly less of this behavior. It appeared that the RSSM particles "stuck" to the surface better than the commercial salt; this may be a result of less crystallinity, less density, or a generally "stickier" nature of the RSSM particles. In addition when the sprinkled surface was gently turned over, it appeared that 30-40% of the RSSM material remained in contact, whereas less than 25% of the table salt remained in contact.

Example 6

The rate of dissolution (or solubilization) of table salt (Morton's Salt, Non Iodized) and RSSM found in Sample II of Example 3 (RSSM II) were compared. The solutions were prepared in filtered water and measured using a salt concentration near saturation over time. The complete solubilization as determined by visual examination served as the end point. The composition and attributes of are given in Example 3. Measurements were taken at different temperatures to demonstrate the effect of this parameter. It should be noted that the results for each sample were "as tested" using the same procedures and materials and that the results for the sodium chloride were observed to vary from the results for purified sodium chloride in the scientific literature. The following results were obtained.

TABLE 1

Solubility (saturation on salt basis)

| | Solubility (g per 100 g water) | | | | |
|---|---|---|---|---|---|
| Sample ID | 25° C. | 40° C. | 60° C. | 75° C. | 90° C. |
| NaCl | 31.92 | 32.16 | 32.32 | 32.64 | 33.36 |
| RSSM II | 59 | 59.96 | 61.04 | 62.4 | 63.08 |

Figure 6:
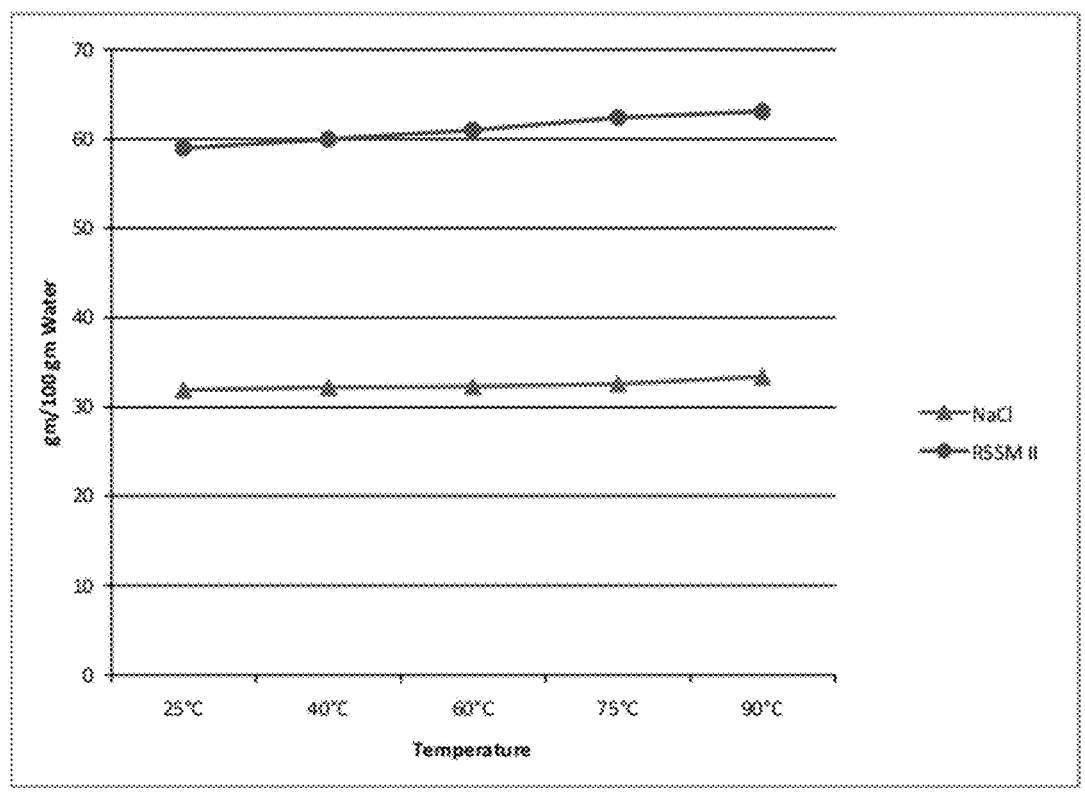
FIG. 6 is a graph illustrating the water solubility of a 60:30:10 sodium chloride, maltodextrin and potassium chloride composition prepared in accordance with Example 3 compared to salt.

The solubility of these two compositions is illustrated in FIG. 6. As shown in FIG. 6, the RSSM II sample showed significantly greater solubility over all temperature ranges when compared to a sodium chloride solution without biopolymers.

TABLE 2

Solubilization Time (at saturation)

| | Solubilization Time (min. to saturate) | | | | |
|---|---|---|---|---|---|
| Sample ID | 25° C. | 40° C. | 60° C. | 75° C. | 90° C. |
| NaCl | 10 | 7.77 | 5.33 | 4.44 | 3.76 |
| RSSM II | 8 | 7.12 | 5.22 | 4.51 | 3.48 |

Figure 7:
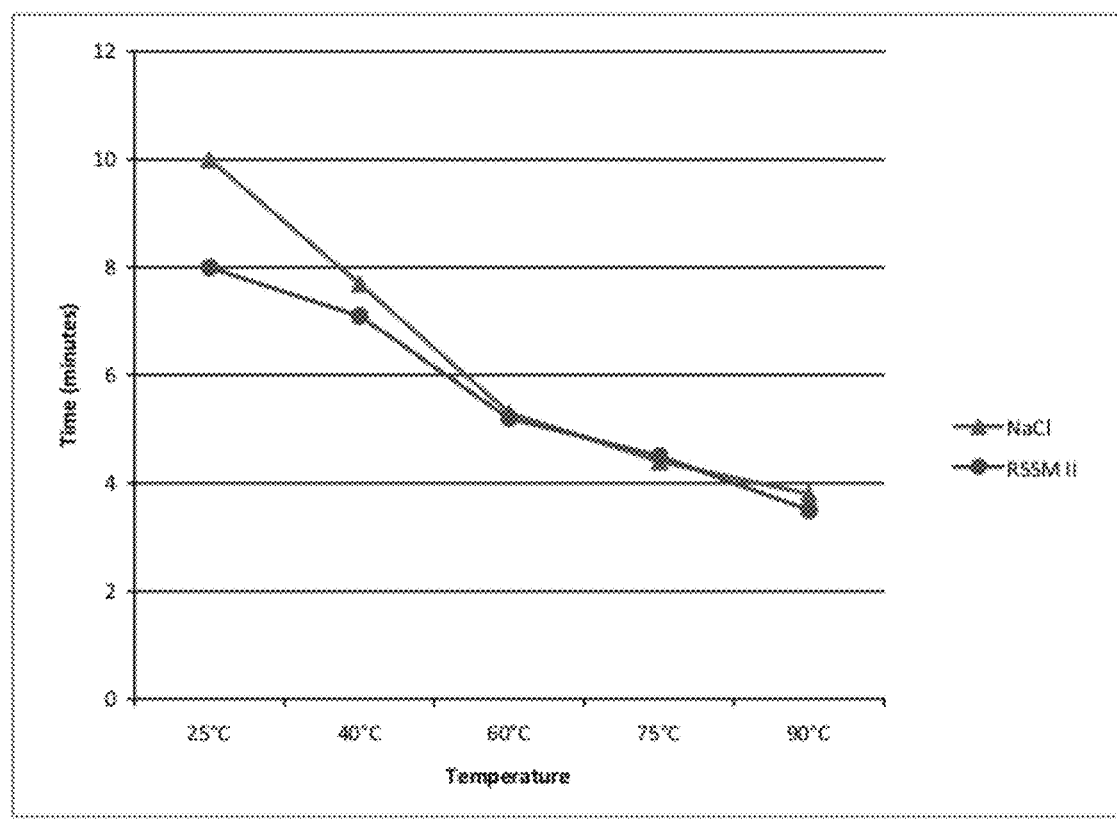
FIG. 7 is a graph illustrating the water solubilization time versus temperature of the materials shown in FIG. 6.

The solubilization time for the two compositions is illustrated in FIG. 7. As shown in FIG. 7, the RSSM II sample showed the same or decreased time to reach saturation over all temperature ranges when compared to a sodium chloride solution without biopolymers.

TABLE 3

Solublility Rate

| | Solublility Rate (g/min) | | | | |
|---|---|---|---|---|---|
| Sample ID | 25° C. | 40° C. | 60° C. | 75° C. | 90° C. |
| NaCl | 3.19 | 4.14 | 6.06 | 7.35 | 8.87 |
| RSSM II | 7.38 | 8.42 | 11.69 | 13.84 | 18.13 |

Figure 8:
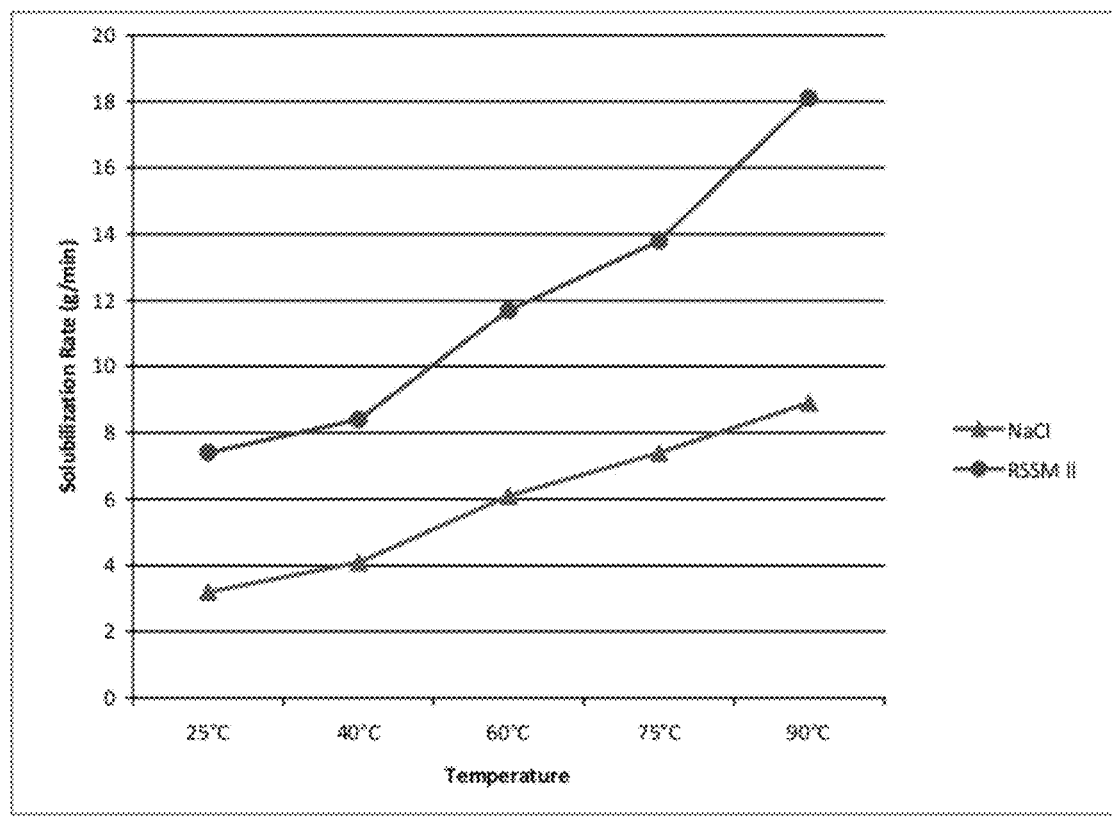
FIG. 8 is a graph illustrating the rate of solubilization of the materials shown in FIG. 6 at various temperatures.

The solubility rate for the two compositions is illustrated in FIG. 8. As shown in FIG. 8, the RSSM II sample a significantly greater solubility rate over all temperature ranges when compared to a sodium chloride solution without biopolymers. In other words, the RSSM II sample reaches saturation more quickly and therefore, even with a reduced sodium chloride content, would be expected to deliver the same or increased salt flavor profile when compared to sodium chloride without biopolymers.

Example 7

Example 7 was prepared to compare a scaled up version of a process similar to Example 3. Sixty pounds of evaporated sea salt, 30 pounds of M100 MALTRIN® Maltodextrin, and 10 pounds of potassium chloride were added to 300 pounds of tap water with agitation. The mixture was agitated until all the solids were dissolved. The final solution was clear and colorless and contained 25% solids with a ratio of 60% sodium chloride, 30% maltodextrin and 10% potassium chloride.

The Salt/Maltodextrin mixture was dried on a 60 inch diameter Conical Spray Drier utilizing a single fluid high pressure atomizing nozzle.

| | |
|---|---|
| Main Drying Chamber Vacuum | 0.5 inches of water |
| Inlet Temperature | 380° F. |
| Outlet Temperature | 180° F. |
| Nozzle Pressure | 3000 psi |

The materials produced according to Example 7 appeared to have similar properties and characteristics of those prepared in the smaller scale processes.

Example 8

RSSM samples from Example 3 were compared with standard table salt when applied to food products. A sample of mashed potatoes was prepared as package directions. The cooked mashed potatoes were allowed to stand for 30 to 40 minutes after which approximately one scoop was then taken and placed on a plate for each of the samples. Next, approximately 0.6 gm of the RSSM samples from Example 3 along with a commercial sodium chloride table salt were sprinkled on the respective mashed potato samples and left to stand for several minutes.

Upon examination it was observed that the RSSM samples from Example 3 exhibited sheen whereas the standard, a commercial table salt, did not. It is postulated that the RSSM compositions spread over the surface of the potatoes. This effect was not observed with the standard sample. It is hypothesized that this effect occurred because of the high dissolution rate and dispersion of the RSSM sample compositions in the upper layer. That is, there was sufficient free water in the mashed potatoes to rapidly dissolve the RSSM particles to allow them to spread over the surface of the mashed potatoes. The distribution of RSSM components such as the maltodextrin gave rise to a shiny surface (or sheen) suggesting that the compositions exhibit physiochemical attitudes such as dispersal in low water environments.

Example 9

A taste test was conducted by a nationally recognized food testing laboratory at its facility with 150 consumers. Each consumer tried three samples per day over a period of two days. Between 33-50% of the participants were men.

The test used samples having a standardized 0.5 g of sodium chloride placed on 57 g of mashed potatoes. This level of salt was determined to be sufficient to allow consumers to comment on differences between the products. Consumers were asked to take at least three bites of each sample to allow for any uneven distribution of the salt.

Following are the products which are described in Example 3 that were included in the study:
RSSM Sample I from Example 3
RSSM Sample II from Example 3
RSSM Sample III from Example 3
commercially available Morton's Salt Substitute (KCl)
commercially available Morton's Lite Salt (NaCl and KCl)
commercially available Morton's Salt (Iodide free, NaCl)
The following are key highlights from the study:
RSSM Samples I, II, and III were preferred over all three commercial products for overall preference, flavor preference, and saltiness preference with a 95% confidence level.

All three of the RSSM compositions were preferred over all three commercial products for flavor strength (except RSSM Sample I vs. commercial Morton Salt) with a 95% confidence level.

The salt substitute and lite salt were evaluated as extremely bitter and having an unpleasant aftertaste compared to all three compositions and commercial Morton's salt.

All three compositions were rated as Very/Extremely Bitter by only 1-2% of consumers.

The results of the study suggest that RSSM Samples I, II, and III perform very well in delivering the salty flavor that consumers like/expect. The compositions appear to provide the benefit of extending the salty flavor, while allowing the amount of sodium chloride to be reduced.

Example 10

In Example 10, a sample was prepared to illustrate 60:40 sodium chloride and maltodextrin. Approximately 5 gallons of a 60:20 mixture of sodium chloride (Morton Refined Salt) and maltodextrin (MALTRIN® M100, Grain Processing Corporation) composition was prepared as generally outlined in Example 1. The sodium chloride-maltodextrin blend was spray dried using the pilot scale Bowen dryer described in Example 1. The dried white powder recovered had a moisture content of less than 3% (dry solid basis) and was free flowing.

Micrographs of the recovered 60:40 sodium chloride and maltodextrin particles show the substantially amorphous character of the material. FIG. 9 is a 5 micron resolution micrograph of the powder sample which shows essentially no crystal character. Similarly, FIG. 10 is 2 micron resolution micrograph further illustrating the amorphous particle.

Example 11

A seasoning composition is prepared by blending the amorphous particles prepared in accordance with Example 10 with garlic powder. This powder is added to a mashed potato premix and packaged for sale.

It is thus seen that a salt composition may be prepared in accordance with the foregoing teachings.

All references cited are hereby incorporated by reference in their entireties.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

The invention claimed is:

1. A method comprising:
   providing an aqueous solution that includes sodium chloride and a crystallization interrupter selected from among nonionic biopolymers and biooligomers; and
   drying the aqueous solution to cause the biopolymer and sodium chloride to form particles, where at least a majority of the sodium chloride is present in an amorphous form, said particles being suitable for consumption, the method providing particles having an average size larger than about 100 microns.

2. The method of claim 1 wherein said particles include about 40% to about 80% sodium chloride.

3. The method of claim 1 wherein said particles include up to 70% sodium chloride.

4. The method of claim 1 wherein upon drying substantially all of the sodium chloride is present in amorphous form.

5. The method of claim 1 wherein the crystallization interrupter is selected from the group consisting of oligosaccharides, polysaccharides, proteins, protein derivatives and combinations thereof.

6. The method of claim 1 wherein the crystallization interrupter is a starch hydrolysate.

7. The method of claim 6 wherein the starch hydrolysate is a maltodextrin.

8. The method of claim 1 wherein the drying step is selected from the group consisting of spray drying and evaporation.

9. The method of claim 1 further comprising the step of adding at least one seasoning to form a seasoning composition.

10. The method of claim 1 further comprising the step of at least partially coating the dried particles with microcrystalline salt.

11. The method of claim 1 wherein the mixture includes about 40% to about 70% sodium chloride and the drying step includes spray drying.

12. A method comprising:
    providing a food product; and
    adding a salt composition according to claim 10.

13. A method comprising:
    providing an aqueous solution that includes up to about 70% sodium chloride and a crystallization interrupter selected from among biopolymers and biooligomers; and
    drying the aqueous solution to cause the biopolymer and sodium chloride to form particles, where at least substantially all of the sodium chloride is present in an amorphous form, said particles being suitable for consumption, the method providing particles having an average size larger than about 100 microns.

14. A method according to claim 1, said particles comprising from about 15% to about 80% sodium chloride.

15. A method according to claim 13, said particles comprising from about 15% to about 80% sodium chloride.

16. A method comprising:
    providing an aqueous solution that includes sodium chloride and a crystallization interrupter selected from among nonionic biopolymers and biooligomers; and
    drying the aqueous solution to cause the biopolymer and sodium chloride to form particles, where at least a majority of the sodium chloride is present in an amorphous form, said particles being suitable for consumption, further comprising the step of at least partially coating the dried particles with microcrystalline salt.

17. The method of claim 16 wherein said particles include about 15% to about 80% sodium chloride.

18. The method of claim 16 wherein said particles include up to 70% sodium chloride.

19. The method of claim 16 wherein upon drying substantially all of the sodium chloride is present in amorphous form.

20. The method of claim 16 wherein the crystallization interrupter is selected from the group consisting of oligosaccharides, polysaccharides, proteins, protein derivatives and combinations thereof.

21. The method of claim 16 wherein the crystallization interrupter is a starch hydrolysate.

22. The method of claim 21 wherein the starch hydrolysate is a maltodextrin.

23. The method of claim 16 wherein the drying step is selected from the group consisting of spray drying and evaporation.

24. The method of claim 16 further comprising the step of adding at least one seasoning to form a seasoning composition.

25. A method comprising:
    providing an aqueous solution that includes up to about 70% sodium chloride and a crystallization interrupter selected from among biopolymers and biooligomers; and
    drying the aqueous solution to cause the biopolymer and sodium chloride to form particles, where at least substantially all of the sodium chloride is present in an amorphous form, said particles being suitable for consumption, further comprising the step of at least partially coating the dried particles with microcrystalline salt.

26. A method according to claim 25, said particles comprising from about 15% to about 80% sodium chloride.

27. A method comprising:
   providing an aqueous solution that includes sodium chloride and a crystallization interrupter selected from among nonionic biopolymers and biooligomers; and
   drying the aqueous solution to cause the biopolymer and sodium chloride to form particles, where at least a majority of the sodium chloride is present in an amorphous form, said particles being suitable for consumption, said particles comprising from about 35% to about 80% sodium chloride.

28. The method of claim 27 wherein said particles include at least 50% sodium chloride.

29. The method of claim 27 wherein said particles include at least 60% sodium chloride.

30. The method of claim 27 wherein upon drying substantially all of the sodium chloride is present in amorphous form.

31. The method of claim 27 wherein the crystallization interrupter is selected from the group consisting of oligosaccharides, polysaccharides, proteins, protein derivatives and combinations thereof.

32. The method of claim 27 wherein the crystallization interrupter is a starch hydrolysate.

33. The method of claim 32 wherein the starch hydrolysate is a maltodextrin.

34. The method of claim 27, wherein the crystallization interrupter is selected from the group consisting of oligosaccharides, polysaccharides, proteins, protein derivatives and combinations thereof, the method providing particles having an average size larger than about 100 microns.

* * * * *